C. S. BAILEY.
Hulling Machine.
No. 92,690.
2 Sheets—Sheet 1.
Patented July 20, 1869.
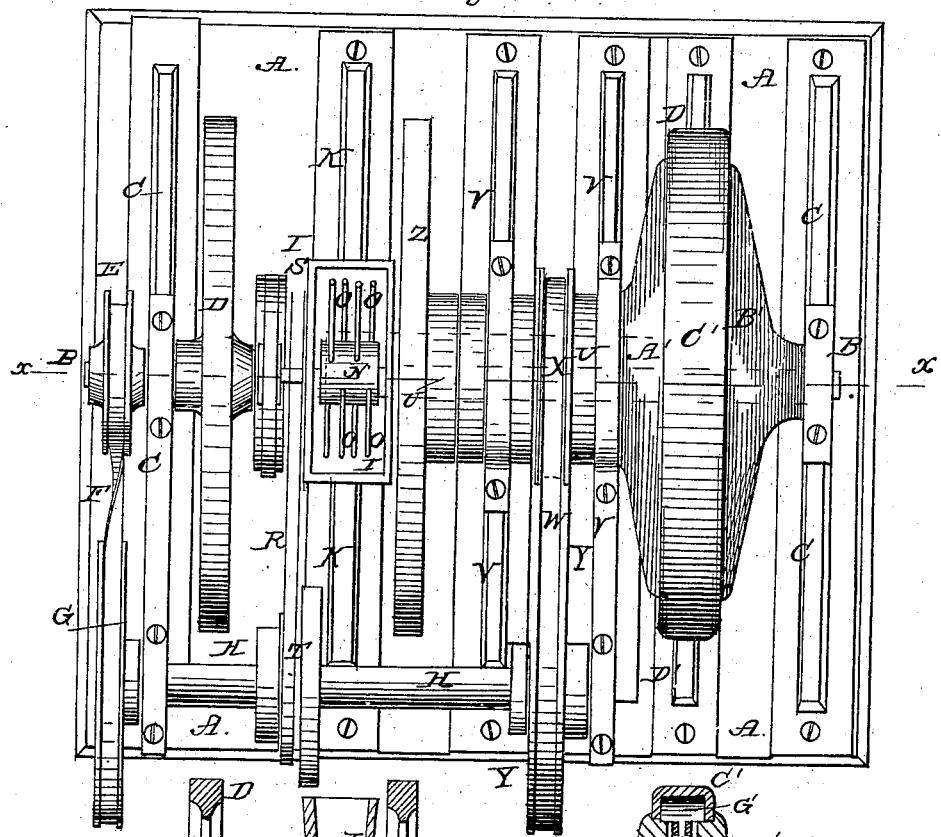
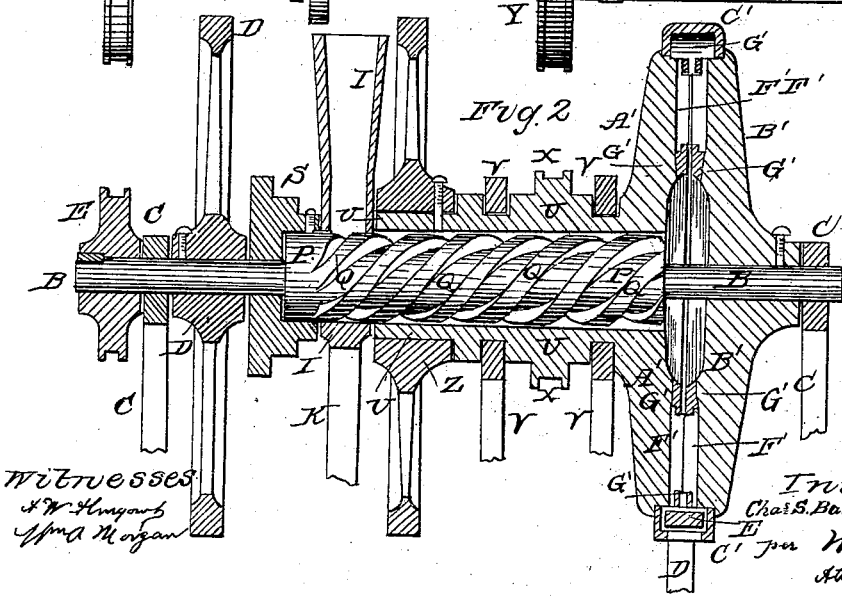

C. S. BAILEY.
Hulling Machine.
No. 92,690.
2 Sheets—Sheet 2.
Patented July 20, 1869.
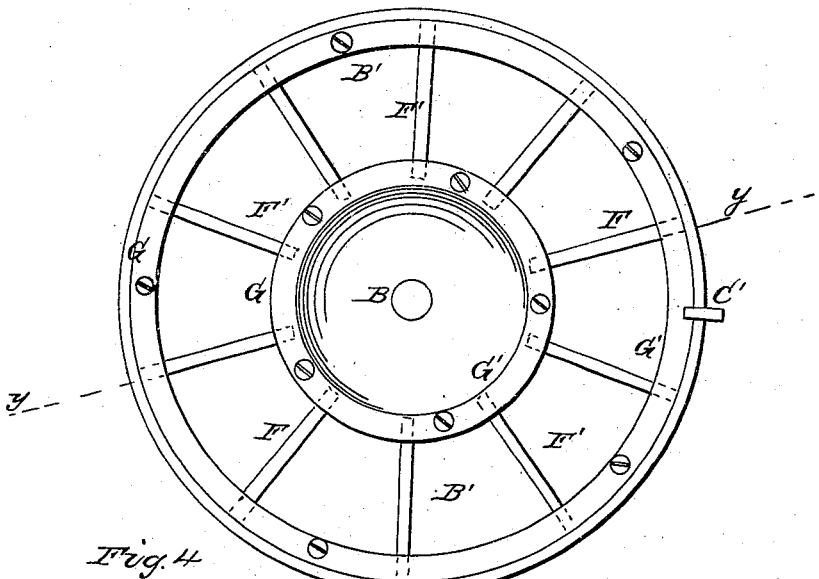
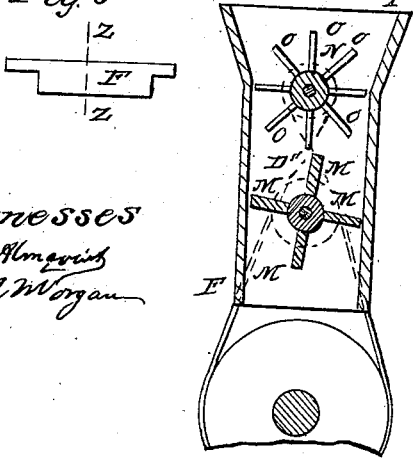
Witnesses
A. W. Almquist
Thos. A. Morgan
Inventor
Chas. S. Bailey
per Munn & Co.
Attorneys.

United States Patent Office.

CHARLES S. BAILEY, OF NEW YORK, N. Y.

Letters Patent No. 92,690, dated July 20, 1869.

IMPROVED CENTRIFUGAL HULLING-MILL.

The Schedule referred to in these Letters Patent and making part of the same.

*To all whom it may concern:*

Be it known that I, CHARLES S. BAILEY, of the city, county, and State of New York, have invented a new and improved Centrifugal Hulling-Mill; and I do hereby declare that the following is a full, clear, and exact description thereof, which will enable others skilled in the art to make and use the same, reference being had to the accompanying drawings, forming part of this specification.

Figure 1, Sheet I, is a top or plan view of my improved hulling-mill.

Figure 2, Sheet I, is a vertical section of the same, taken through the line $x$ $x$, fig. 1.

Figure 3, Sheet II, is a face view of one of the hulling-disks.

Figure 4, Sheet II, is a detail sectional view of the same, taken through the line $y$ $y$, fig. 3.

Figure 5, Sheet II, is an enlarged detail sectional view of the feeding-hopper and its attachments.

Figure 6, Sheet II, is a side view of one of the cutters or hulling-knives.

Figure 7, Sheet II, is a face or edge view of the same.

Figure 8, Sheet II, is a cross-section of the same, taken through the line $z$ $z$, fig. 6.

Similar letters of reference indicate corresponding parts.

My invention has for its object to furnish a simple, convenient, and effective hulling-mill, designed especially for hulling cotton-seeds, but which may be applied, with equal facility and advantage, for hulling other seeds, and which shall, at the same time, be so constructed as to remove, automatically, nails or other pieces of iron that may have got into the seed accidentally; and It consists in the construction and combination of the various parts of the machine, as hereinafter more fully described.

A is a bed-plate, to which the frame, frames, or supports for the various parts of the machine are securely attached.

B is a horizontal shaft, the ends or journals of which revolve in bearings in the supports or frame C.

To the shaft B, at or near one end, are attached a fly-wheel, D, and a driving-pulley, E.

F is a band passing around the pulley E, attached to the said shaft B, and around a pulley, G, attached to the driving-shaft H.

I is the hopper, into which the seed to be hulled is placed, and from which it is conveyed to the hulling-device by means of the carrier or feeding-screw.

The hopper I is attached to and supported by the support or frame K, and has a hole formed through its lower part, for the passage of the shaft B, and the carrier or feeding-screw.

D″ is a shaft pivoted in and to the lower part of the hopper I, and which is provided with wings or paddles M, which receive the seed and feed it to the carrier-screw, so that the seed may be fed to said carrier regularly, and in uniform quantities.

The shaft D″ may be driven from the shaft B, by a belt passing around said shaft B, or around a pulley attached to said shaft.

N is a shaft pivoted in and to the upper part of the hopper I, and which may be driven from the shaft L, by means of a belt or band, as shown in dotted lines in fig. 5.

The shaft N is provided with a series of magnets, or magnetic arms, O, by means of which nails or other pieces of iron that may be in the seed may be caught and held, and thus be prevented from passing into the mill, which said pieces of iron may be removed from the said magnets by hand, after the mill has been stopped. These magnets, it will be observed, must necessarily revolve at a low rate of speed.

I do not wish to be confined to the precise arrangement of magnets herein shown and described, as magnetism may be applied in various other ways, for the withdrawal of pieces of iron from the seed.

P is a tube, through which the shaft B passes, and which passes through the lower part of the hopper I, and extends to the hulling-device.

To the outer surface of the tube P is attached, or upon it is formed, a spiral flange, Q, for conveying the seed from the hopper to the hulling-device.

The carrier P Q is driven from the driving-shaft H by a belt, R, which passes around the cone-pulley S, attached to the end of the tube P, and around a cone-pulley, T, attached to the said driving-shaft H, so that by shifting the said belt R, the rapidity of feed may be regulated at pleasure.

U is a tube, through which the shaft B and carrier-screw P Q pass, and within which said shaft and carrier revolve.

The tube U revolves in bearings in the supports V, and is driven from the driving-shaft H by a band, W, passing around the pulley X, attached to or formed upon the said tube U, and around a pulley, Y, attached to the said shaft H.

The tube U is also provided with a fly-wheel, Z, as shown in figs. 1 and 2, to regulate and give steadiness to its movement.

A′ is a disk rigidly attached to, or formed solidly upon the outer end of the tube U, so as to be carried around with said tube in its revolution.

B′ is a disk, similar in size, form, and construction, to the disk A′, and which is adjustably attached to the outer end of the shaft B, by a set-screw or screws, so that it may be carried around with and by the said shaft B, in its revolution, and so that it may be adjusted nearer to or further from the disk A′, as may be desired.

C' is a rim passing around the edges of the disks A' and B', and which is attached to and supported by the support or frame D'.

The circular rim C' is grooved or channelled upon its inner or concave side, as shown in fig. 2, to receive the seed as it passes from the hulling-disks A' B', and from which said seed escapes through a hole in the bottom or lower part of said rim, as shown in fig. 2.

To the edge of one of the disks A' B' is attached a scraper, E', corresponding in size and form to the size and form of the channel in the rim C', which scraper, as the disk to which it is attached revolves, forces the seed through the said channel, so that it may all pass out, thus preventing the possibility of the said channels becoming filled or clogged up with the seed.

The middle parts of the faces of the disks A' and B' are hollowed out or concaved, as shown in figs. 2, 3, and 4, to form a recess or receptacle to receive the seed from the carrier P Q.

The faces of the disks A' and B' are grooved or channelled radially, to receive the hulling-knives or cutters F'.

The knives or cutters F' are formed with a shoulder at each end, and are set with their back edges in the radial grooves in the faces of the disks A' and B', in such a way that their forward or working-edges may project an eighth of an inch, more or less, beyond the faces of the said disks, as shown in figs. 2, 3, and 4.

The knives or cutters F' are secured in place by the ring-plates G', which rest upon the shoulders formed upon the ends of the knives F', and fit into circular grooves formed in the faces of the disks A' and B', so that their outer surfaces may be flush with the faces of the said disks A' B', as shown in the drawings.

It should be observed that the tube or cylinder U, and disk A', should be driven in one direction, while the shaft B and disk B' are driven in the other direction. This may be effected by simply crossing one or the other of the belts by which said parts are driven.

It should also be observed that when one edge of the knives F' becomes dulled, the motion of the disks A' B' may be reversed, so as to use the outer edge of said knives.

This enables the knives to be used without removal, until worn down to, or nearly to the faces of the disks A' B', when the said knives should be removed, and replaced with a new set.

As the machine is being used, the seed fed into the cavity in the middle part of the faces of the disks A' B' by the carrier P Q, is driven through the space between the faces of the said disks A' B', by the centrifugal force engendered by the rapid revolution of the said disks A' B', and is acted upon during its passage, by the knives F', so that it passes from the machine thoroughly hulled.

I claim as new, and desire to secure by Letters Patent—

1. The hulling-knives or cutters F', constructed with shoulders upon their ends, substantially as herein shown and described, and secured in radial grooves in the faces of the disks A' B' by the ring-plates G', substantially as herein shown and described, and for the purpose set forth.

2. The combination of the shaft N and magnetic bars or arms O with the hopper I, substantially as herein shown and described, and for the purpose set forth.

3. The revolving carrier P Q, constructed as described, in combination with the hopper I, revolving tube or cylinder U, revolving shaft B, and disks A' and B', as and for the purpose set forth.

4. The combination of the scraper E' and internally-grooved rim C' with the disks A' B', constructed as herein shown and described, and for the purpose set forth.

The above specification of my invention signed by me, this 30th day of October, 1868.

CHARLES S. BAILEY.

Witnesses:
E. GREENE COLLINS,
JAMES T. GRAHAM.